Figure 1:
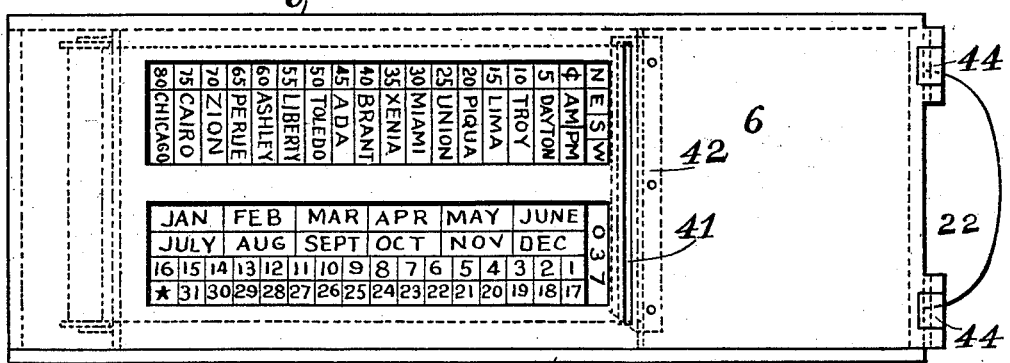

No. 758,023. PATENTED APR. 19, 1904.
J. M. SIEBLER.
TICKET ISSUING MACHINE.
APPLICATION FILED APR. 20, 1903.
NO MODEL. 4 SHEETS—SHEET 1.

WITNESSES:
John W. Kalthus
C. M. Theobald.

INVENTOR
J. Matthew Siebler
BY R. J. McCarty
ATTORNEY

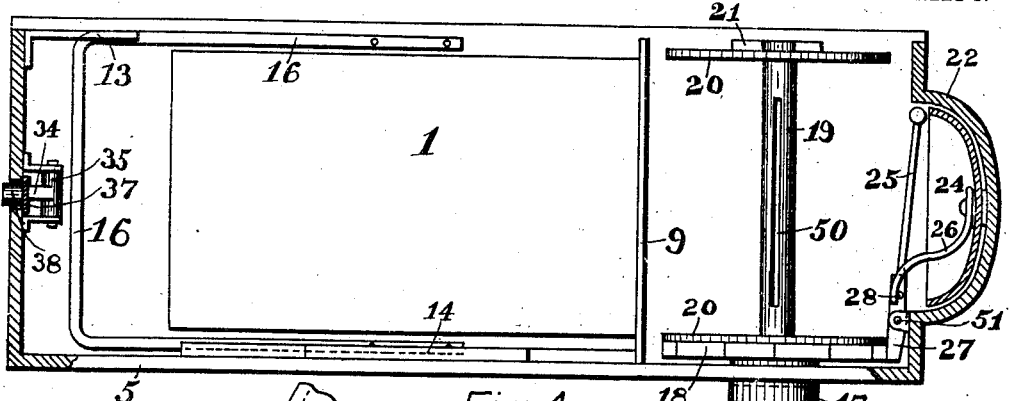

No. 758,023. PATENTED APR. 19, 1904.
J. M. SIEBLER.
TICKET ISSUING MACHINE.
APPLICATION FILED APR. 20, 1903.
NO MODEL. 4 SHEETS—SHEET 3.
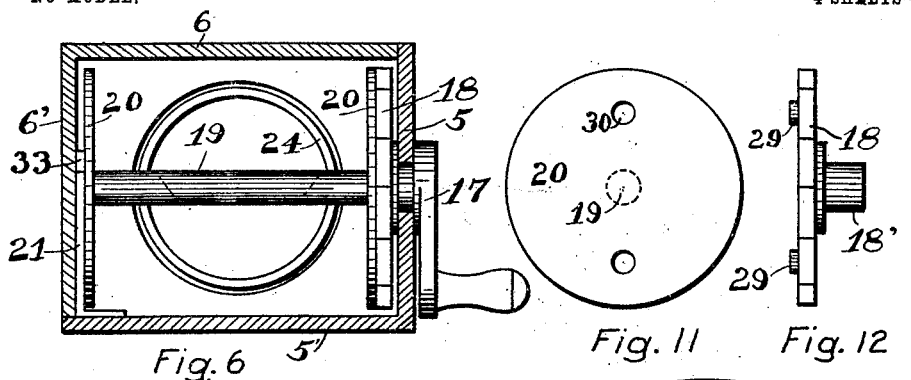
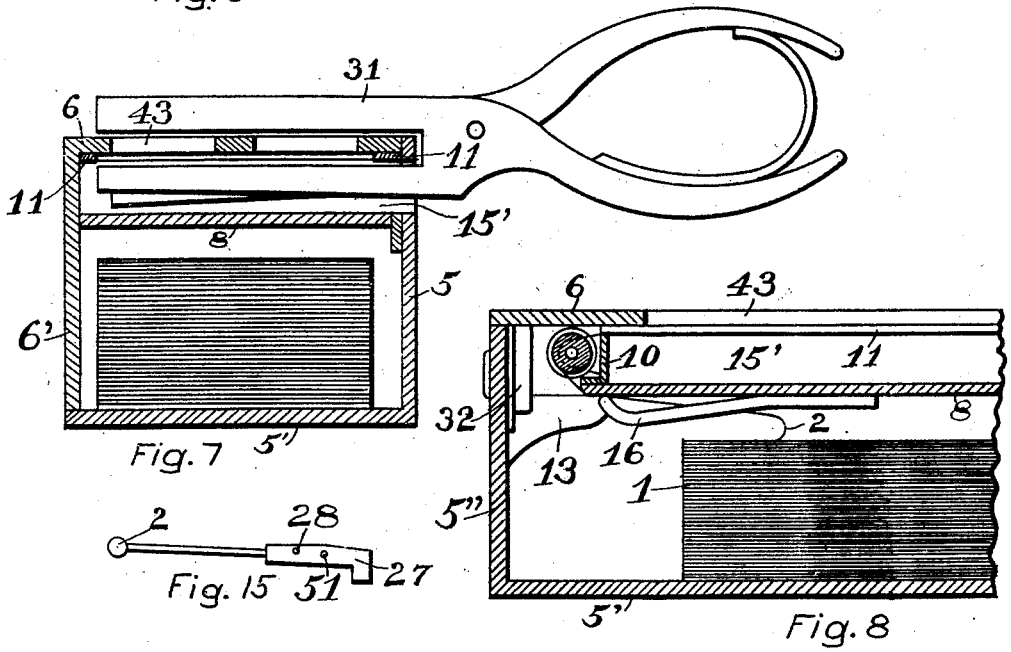
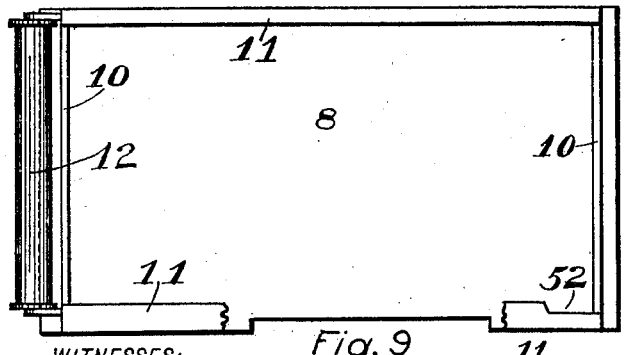
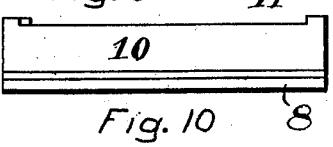

No. 758,023. PATENTED APR. 19, 1904.
J. M. SIEBLER.
TICKET ISSUING MACHINE.
APPLICATION FILED APR. 20, 1903.
NO MODEL. 4 SHEETS—SHEET 4.

SPOOL END

WITNESSES:
INVENTOR
ATTORNEY

No. 758,023.

Patented April 19, 1904

UNITED STATES PATENT OFFICE.

JOHN MATTHEW SIEBLER, OF DAYTON, OHIO.

TICKET-ISSUING MACHINE.

SPECIFICATION forming part of Letters Patent No. 758,023, dated April 19, 1904.

Application filed April 20, 1903. Serial No. 153,437. (No model.)

*To all whom it may concern:*

Be it known that I, JOHN MATTHEW SIEB-LER, a citizen of the United States, residing at Dayton, in the county of Montgomery and State of Ohio, have invented certain new and useful Improvements in Ticket-Issuing Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention comprises a machine for issuing duplex tickets.

The object of the invention is to provide a machine of the above type adapted to contain a continuous ribbon or strip of duplex tickets, said continuous ribbon or strip of duplex tickets being folded longitudinally throughout its length and so placed within the machine that the feeding or issuing therefrom of the tickets will not cause the ribbon of tickets remaining in the machine to shift out of alinement, and thus render impossible a correct working of the machine.

Heretofore much difficulty has been experienced in the issuing of duplex tickets from continuous rolls, owing to the fact that a double strip or ribbon of duplex tickets when wound upon a roll will be out of alinement. In other words, the names on the inner ribbon of tickets will be out of alinement with those on the outer ribbon, and the consequence will be the punch-mark on one ticket will not be in a corresponding place on the other ticket. As a matter of fact it is impracticable to operate a ribbon of duplex tickets from a roll. This objectionable feature is entirely obviated by the manner in which I place the supply of duplex tickets in the cabinet. The continuous ribbon of duplex tickets is folded in the center longitudinally and is then folded laterally back and forth in the form of a compact tablet, preferably the length of a single ticket. This arrangement enables the under tickets of each ribbon to be in proper alinement with the outer tickets. In other words, the same station-names and other matter is common to the tickets of both ribbons, and when the ribbon is folded longitudinally the various names on each outer ticket should be in alinement with those on the inner tickets, so that the punch-marks will be uniform on both tickets.

A further object of my invention is to provide a machine of the above type which is compact and devoid of intricate mechanism. The machine is of a size which may be conveniently carried upon the person of the conductor—for example, in his pocket. The tickets may be readily issued from the machine by the conductor, and when each ticket is issued the attention of the passengers or occupants of a car is directed to the operation through the sounding of a bell which is operated each time a ticket is issued.

Preceding a detail description of my improved ticket-issuing machine reference is made to the accompanying drawings, of which—

Figure 2:
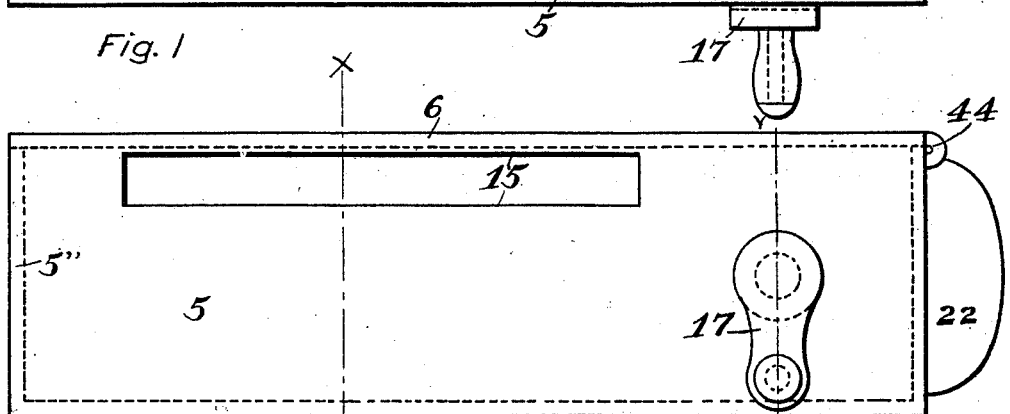
Figure 3:
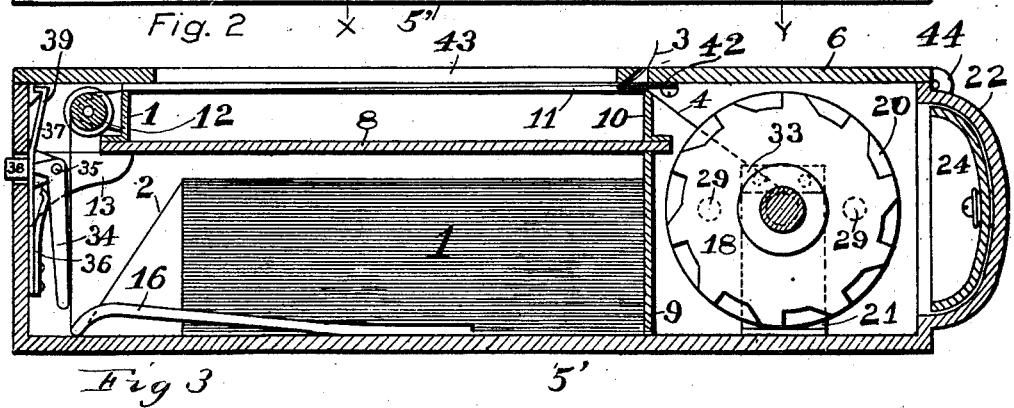
Figures 13, 14:
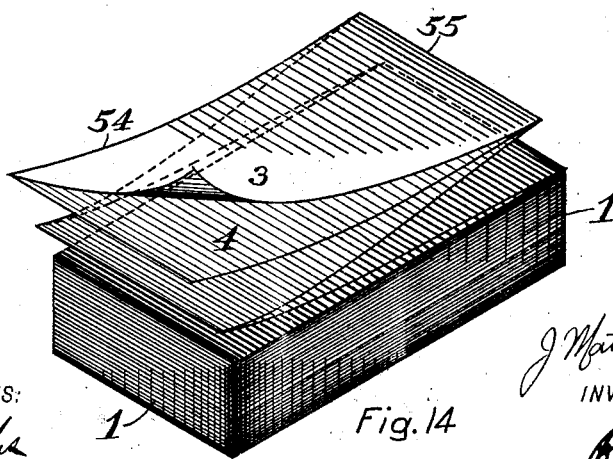

Figure 1 is a top plan view of the machine, showing a duplex ticket in position to be punched or perforated. Fig. 2 is a side elevation of the machine. Fig. 3 is a longitudinal section of the same. Fig. 4 is a top plan view with the cover removed, showing the casing in section. One side of the casing is also removed with the cover. Fig. 5 is a side elevation with the cover elevated to reveal the interior of the casing. Fig. 6 is a cross-sectional view on the line $y\,y$ of Fig. 2. Fig. 7 is a cross-sectional view on the line $x\,x$ of Fig. 2, showing the punch in position to perforate the tickets in duplicate, as shown in Fig. 1. Fig. 8 is a sectional elevation of a portion of the casing, showing an old form of cover-locking mechanism. Fig. 9 is a detail plan view of the guide for the ribbon of duplex tickets. Fig. 10 is an end view of Fig. 9. Fig. 11 is a detail view of the reel upon which the stored tickets are wound. Fig. 12 is a detail view of a ratchet-wheel through which a bell is sounded and the storage-reel is rotated. Fig. 13 is a plan view of a duplex ticket in the form of a continuous ribbon, the ticket being unfolded and a portion broken away. Fig. 14 is a perspective view of a tablet consisting of a ribbon of duplex tickets folded longitudinally and crosswise, as shown in Fig. 13. Fig. 15 is a detached view of the bell-hammer and ratchet-pawl. Fig. 16 is a detail view showing the position of the knife by which the tickets are severed longitudinally as they are issued, one to be detached and delivered to each passenger and the others to be stored in a continuous ribbon on the storage-reel. Fig. 17 is a cross-sectional view on the line $yy$ of Fig. 2, showing a modification in the spindle of the storage-reel. Fig. 18 is a cross-sectional view of the upper portion of the machine, showing some modification in the guideway through which the ribbon of tickets is fed.

In a detail description of my invention similar reference characters indicate corresponding parts.

The casing in which the mechanism is housed is preferably constructed of sheet metal and may consist of any shape or design that is adapted for the purposes of the invention.

In the drawings I have shown the preferred form of consruction of the casing, which I will now describe. The said casing consists in two separable parts, 6 being the top or cover thereof and 6' being one side thereof, both being integrally united. In the top or cover 6 there are provided two parallel openings 43, through which the upper one, 3, of the duplex tickets is exposed, the bottom ticket, 4, being exposed below, so that a punch may perforate both tickets at one operation. The other side 5, the bottom 5', and the end 5" of the casing, as well as the end housing 22, are integral parts, and these are united to the top 6 and the side 6' by hinges 44 at one end. The side 5 of the casing is provided with suitable openings 15, which provide access to a punch-space 15', which is inclosed at the bottom by a wall 8 and by end walls 10 10, as shown in Figs. 3, 7, and 8. These openings 15, as before stated, provide suitable space, which is occupied by the punch 31, as shown in Fig. 7, in which position the said punch encompasses the entire width of the duplex tickets, so that in punching the name of the station, the fare, the date of the issuance of the ticket, and the direction, as shown on the ticket 3, to be delivered to the passenger, as shown in Fig. 1, the lower ticket will likewise be punched in similar places. It will be observed from Fig. 13 that the tickets are right and left handed, so that when folded longitudinally on the perforated line 54 the stations and other matter appearing on one ticket will be in alinement with those on the other ticket, so that the punch will perforate both tickets at the same point, and thus an exact duplicate of each issued ticket is obtained. The ribbon of tickets so folded longitudinally is again folded laterally back and forth along the lines 55 in the form of a tablet 1, as shown in Fig. 14. This manner of folding the ribbon of tickets is a very important feature of my invention, for the reason that the tickets when so arranged within the casing will feed properly at all times in the issuing of the tickets. The tickets will feed accurately from this tablet, so that in punching the upper ticket 3, which is the ticket to be delivered to the passenger, the lower ticket 4, or that ticket which is stored within the machine, is sure to be punched or perforated in a similar place. The stored ribbon, consisting of the duplicates 4 of the issued tickets 3, can be relied upon to accurately represent each and every ticket that has been issued from the machine.

The tablet 1 of tickets may comprise any suitable number of duplex tickets, according to the size of the machine. A machine of the size illustrated in the drawings may easily contain one hundred duplex tickets or two hundred tickets in all. The tablet so made up is placed within the machine, and the leading end of the duplex ribbon (indicated by 2) is held taut by means of a tension-yoke 16, which has a sufficient springy nature to suitably yield in its tension upon the ribbon. After passing below this tension device 16 the duplex ribbon 2 is carried upwardly over a feed-roller 12, which is suitably journaled in brackets extending from a cross-piece 10, of which there are two, forming the end inclosures of the punch-space 15'. The ribbon is carried from said roller below the openings in the top of the casing, as hereinbefore described, and the upper tickets 3 are each fed through the opening 41 in the top of the casing. The ribbon comprising the stored tickets 4 is carried downwardly and is wound upon a reel consisting of spindle 19, the ends of which are provided with disks 20. One end of the spindle 19 is mounted in a bearing 21, attached to the bottom of the casing and free from any connection with the adjacent side of said casing in order that the said adjacent side of the casing may be moved away from the bottom in opening the machine.

33 designates a block secured to the inner side 6' of the casing in a position to inclose the upper side of the bearing 21 and the journal of the spindle when the said side is lowered from the position shown in Fig. 5. The other end of the spindle 19 is fixed to one of the disks 20, which is connected to a ratchet-wheel 18, said ratchet-wheel having studs 29, which enter openings 30 in said disk 20. The ratchet 18 has a bearing-stud 18' projecting therefrom and journaled in a side of the casing. Connected with said stud 18' is a crank 17 or other suitable operating device by means of which the spindle 19 is turned to remove the duplex tickets.

The ribbon of tickets is moved in unison and inseparably to a point below and above the openings in the top of the casing until the point of separation of the tickets is necessary. This separation takes place longitudinally on the line 54 by means of a knife 42, which is secured at a convenient point adjacent to the transverse opening 41 in the top of the casing, and through which the issued tickets 3 are fed out of the machine. The blade or knife 42 extends approximately the length of the opening 41 and effects a clean cut of the tickets as the ribbon is fed forward. The said knife or cutting-blade is constructed of the thinnest quality of sheet metal, so that it will not perceptibly increase the thickness of the duplex ribbon at the point where said blade lies between the folds thereof. As the duplex ribbon is fed forward by the operation of the crank 17 the lower strip of tickets is separated and is properly directed to the storage-reel, while the top tickets 3 are directed upwardly through the slot 41. The knife in addition to cutting the tickets apart longitudinally also insures a proper longitudinal separation of the ribbons at the point of issuance and obviates any possibility of the ribbon of tickets 3 being misdirected to the interior of the casing. The arrangement of the cutting-blade 42 as thus described is clearly illustrated in Fig. 16 of the drawings. Preparatory to the initial operation of the machine the single ribbon comprising the stored tickets 4 is secured to the spindle 19 by passing the end thereof into the slot 50 in said spindle. The reel-spindle 19, as shown in Fig. 17, has the slot 50, extending through to one extreme end. In this modified form of storage-reel the two disks 20 20 are dispensed with and the spindle 19 is free from a fixed connection with the ratchet-wheel 18. The crank 17 is attached directly to an end of the spindle, and said spindle may be withdrawn from the roll of stored tickets by removing it with the crank 17. The bearing for the far end of said spindle consists of two parts 45 and 46, which separate at the point 49, where they inclose the spindle. The part 45 is attached to the side wall 6′, and the part 46 is attached to the bottom of the casing. The roll of stored tickets occupies a compartment at one end of the machine which is inclosed by a wall 9, which extends the width of the machine. The wall 8, hereinbefore referred to as forming the lower inclosure of the punch-space 15′, is supported at one end upon the wall 9, at one corner upon a bracket 13, and at one side upon a strip 14, secured to the side 5 of the casing.

24 indicates a bell which is mounted within the housing 22.

25 is a bell-hammer fixed to one end of a ratchet-pawl 27, which is pivoted at 51. The ratchet-pawl 27 projects in the path of the ratchet-wheel 18, and the said pawl is held in such position by a spring 26, which engages a pin 28, projecting from said pawl. In the movements of the ratchet-wheel 18, which take place, as hereinbefore specified, by the movement of the crank 17, the said ratchet-wheel engages with the pawl 27 and causes the bell-hammer 25 to move outwardly from the bell. When the pawl is freed from engagement with the ratchet-teeth on wheel 18, it is given over to the spring 26, which throws inwardly the bell-hammer and causes an alarm. There are a sufficient number of teeth on the ratchet-wheel 18 to cause a succession of quick vibratory movements of the bell-hammer, so that a sufficient alarm will be given to attract attention. The casing is locked, so that access of the person operating the machine cannot be had thereto. The form of locking mechanism shown in Fig. 3 consists of a lever 34, which is pivoted at 35 and lies parallel with that portion of the ribbon 2 lying between the tension device 16 and the guide-roller 12. (See Figs. 3 and 5.) The ribbon at this point forms a wall which prevents the lever 34 moving in the direction of said ribbon. Therefore the said lever will only move in that direction after the tablet 1 has been entirely exhausted, and at that time only can the casing be unlocked.

36 is a spring which presses against the lever 34 in the direction of the ribbon, and when the ribbon is moved away from the opposite side of said lever the spring 36 will move said lever, as shown in Fig. 5. The casing may then be unlocked.

37 is a spring-catch engaging with a catch 39, secured to one end of the lid of the machine. The spring 37 is secured at its lower end and has a push-button 38, which projects through an opening in an end of the casing, where access may be had to it. When the lever 34 is in the position shown in Fig. 3, it will be seen that the spring 37 is locked thereby against any movement due to pressure on the button 38; but when said lever is freed by the ribbon 2 being moved away from it the position assumed by said lever will be such that frees the spring-catch 37 and permits it to be moved inwardly by the push-button 38 to disengage the catch 39, and thus permit the cover 6 to be opened upon its hinges 44. The cover is closed by the tapering surface of the catch 39 engaging with the end of the spring-catch 37. Another form of lock is shown in Fig. 8, which consists of the common form of lock, as indicated by 32.

Having described my invention, I claim—

1. In a ticket-issuing machine, a ribbon of duplex tickets folded longitudinally to bring the matter indicated on one ticket in alinement with the similar matter indicated on the other ticket, said ribbon so folded being further folded laterally back and forth to form a tablet of duplex tickets, a knife to sever the tickets longitudinally as they are fed from the tablet, and means for feeding the tickets from said tablet.

2. In a ticket-issuing machine, a ribbon of duplex tickets folded longitudinally, and laterally to provide a tablet of duplex tickets, means for feeding said duplex tickets from the tablet, and a knife to sever said tickets longitudinally so that individual tickets may be delivered to passengers and duplicates stored in a continuous ribbon within the machine.

3. In a ticket-issuing machine, a ribbon of duplex tickets folded longitudinally, and laterally to form a tablet, means for feeding said duplex tickets from the tablet, a tension device controlling the removal of the tickets, and a cutting-blade adapted to sever the tickets longitudinally and to separate and guide said tickets after the severance thereof.

4. In a ticket-issuing machine, a ribbon of duplex tickets folded upon each other longitudinally, and then given a series of lateral or crosswise folds back and forth to form a tablet of duplex tickets, means for feeding the tickets in duplicate from said tablet, a cutter to sever the tickets longitudinally, and means for storing the duplicates of the issued tickets.

5. In a ticket-issuing machine, a ribbon of duplex tickets having a longitudinal fold and a series of cross-folds back and forth whereby a tablet is formed of said ribbon, means for feeding said ribbon from the tablet, tension devices to hold the ribbon taut, a cutter to sever the ribbon of duplex tickets longitudinally into two separate ribbons of tickets, from one of which the tickets to be delivered to passengers are detached, and the other of said ribbons constituting storage duplicates of said passenger-tickets.

6. In a machine for issuing tickets, a ribbon of duplex tickets folded first longitudinally, and then laterally or crosswise by a series of back-and-forth folds to form a tablet of united duplex tickets, means for feeding the tickets from the tablet, a cutter approximately the width of said duplex tickets and adapted to sever the connected edges thereof and to cause a separation of said tickets, a tension device adapted to hold the ribbon of duplex tickets taut, and a storage-reel for receiving the duplicate tickets.

In testimony whereof I affix my signature in presence of two witnesses.

JOHN MATTHEW SIEBLER.

Witnesses:
R. J. McCarty,
Carolyn M. Theobald.